United States Patent [19]

Nichols

[11] 4,122,066
[45] Oct. 24, 1978

[54] FLAME RETARDANT PROPYLENE COMPOSITIONS CONTAINING TRITYL COMPOUND SYNERGISTS

[75] Inventor: George M. Nichols, Evanston, Ill.

[73] Assignee: Borg-Warner Corporation, Chicago, Ill.

[21] Appl. No.: 858,756

[22] Filed: Dec. 8, 1977

Related U.S. Application Data

[63] Continuation-in-part of Ser. No. 810,697, Jun. 28, 1977, abandoned.

[51] Int. Cl.² .................... C08K 5/17; C08K 5/13; C08K 5/01; C08K 5/10
[52] U.S. Cl. ..................... 260/45.85 R; 252/8.1; 260/45.7 R; 260/45.9 QA; 260/45.95 H; 260/45.8 A; 260/45.8 N; 260/45.95 G; 260/45.7 RT

[58] Field of Search .............. 260/45.7 R, 45.7 RL, 260/45.9 QA, 45.95 H, 45.85 R, 45.8 A, 45.8 N, 45.95 G; 252/8.1

[56] References Cited

U.S. PATENT DOCUMENTS

| | | | |
|---|---|---|---|
| 2,957,848 | 10/1960 | Lutz ............................... | 260/45.7 |
| 3,134,747 | 5/1964 | Amos et al. ................. | 260/45.7 RL |
| 3,271,333 | 9/1966 | Eichhorn .................... | 260/45.7 RL |
| 3,441,524 | 4/1969 | Burger et al. ............... | 260/45.7 RL |
| 3,457,204 | 7/1969 | Burger et al. ............... | 260/45.7 RL |
| 3,472,799 | 10/1969 | Burger et al. ............... | 260/45.7 RL |
| 3,832,422 | 8/1974 | Little et al. .................. | 260/45.7 |

Primary Examiner—V. P. Hoke
Attorney, Agent, or Firm—Richard J. Schlott

[57] ABSTRACT

Certain trityl compounds are highly effective synergists which enhance the flame retardant activity of organic bromine compounds used in providing flame retardant polypropylene compositions.

3 Claims, No Drawings

FLAME RETARDANT PROPYLENE COMPOSITIONS CONTAINING TRITYL COMPOUND SYNERGISTS

This application is a continuation-in-part of application Ser. No. 810,697 filed June 28, 1977 which is now abandoned.

BACKGROUND OF THE INVENTION

This invention relates to improved flame retardant polypropylene compositions. More particularly, this invention relates to flame retardant polypropylene compositions comprising polypropylene, organic bromine compounds as flame retardants and minor amounts of certain trityl compounds as synergists. Still more particularly, this invention relates to the use of certain trityl compounds as synergists for organic bromine flame retardants in polypropylene compositions.

Polypropylene is difficult to render flame retardant without resorting to high levels of flame retardant additives. It will be appreciated that large amounts of flame retardant additives will often have an adverse effect upon some of the physical properties of polypropylene, and will add appreciably to the cost. A method for enhancing the activity of flame retardants is needed for use with polypropylene which would permit acheiving adequate flame retardancy with reduced levels of additives.

SUMMARY OF THE INVENTION

This invention provides flame retardant polypropylene compositions having organic bromine compounds as flame retardant additives and certain trityl compounds as synergists to enhance the effectiveness of the organic bromine compounds. The flame retardant compositions may further include conventional synergists such as antimony oxide and other flame retardants such as phosphorous compounds.

DETAILED DESCRIPTION OF THE INVENTION

The trityl compounds useful as synergists for use with organic bromine compounds in the practice of this invention may be generally described as having a triphenylmethyl (trityl) group attached to an activating group A. More specifically, the trityl synergists may be represented by formula $$(C_6H_5)_3C-(CH_2)_n-A$$

wherein A may be —H, —CO$_2$H, —CHO, —CO—Ar, —CO$_2$ Alkyl, CO$_2$ Aryl,

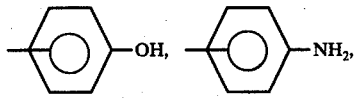

SbCl$_6^-$, BF$_4^-$ and the like, and $n$ is an integer from 0 to 4.

The trityl compounds synergistically enhance the flame retardant activity of organic bromine compounds in polypropylene. The organic bromine compounds are any of the conventional bromine-containing organic compounds generally knwon as flame retardants, such as for example tetrabromophthalic anhydride, tetrabromophthalimide, the brominated phenols and biphenyls, the esters and ethers of brominated phenols, as well as organic compounds containing both bromine and chlorine, and the bromine-containing organic compounds of phosphorus such as tris (2,3-dibromopropyl) phosphate and the like. In general, any organic bromine compound which may be employed as a flame retardant in polypropylene will be made more effective when further compounded with a trityl synergist according to the practice of this invention.

Organic bromine compounds are often used in combination with particular synergists such as antimony oxide, and with particular phosphorus compounds such as triphenyl phosphate, the alkyl pentaerythritol phosphates and the like in flame retardant compositions. When further compounded with trityl synergists according to the practice of this invention, the effectiveness of these combinations is also enhanced.

The polypropylenes which are useful for the practice of this invention are widely available in extrusion, injection molding and fiber grades, and include both the homopolymers of propylene and propylene copolymers containing minor amounts of ethylene or other olefins. Flame retardant polypropylene compositions are obtained when compounded with organic bromine flame retardants, optionally including other flame retardants and synergists. The level of flame retardant organic bromine compound employed will vary depending upon the nature of the particular bromine compound and additional flame retardants selected, however the amounts generally employed in the art have ranged from about 1 part by weight to about 20 parts by weight per hundred parts of polypropylene.

Synergistic enhancement of flame retardant activity is accomplished by adding to these compositions, preferably at the time of compound, from 0.1 parts by weight to 10 parts by weight of the synergistic trityl compound, per hundred parts of final composition. The precise amount of trityl compound employed will vary with the particular bromine flame retardant compound employed, however it has been found that as little as 0.1 parts by weight of trityl compound per hundred parts of the final composition will enhance the activity of organic bromine flame retardants, with the optimum enhancement for most organic bromine compounds being exhibited when the weight of trityl compound is about one-half to one-tenth that of the organic bromine flame retardant compound present in the composition. It will be understood that other methods for compounding may be employed, including preparing a mixture of the organic bromine compound and the trityl synergist in the appropriate weight ratio and subsequently adding that composition to the polypropylene in a compounding operation.

The invention will be better understood by consideration of the following examples, which are provided by way of illustration and not limitation.

Polypropylene compositions in the following Examples were prepared by blending the indicated ingredients in powder form in the amounts shown in Table I. The powder blends were then compression molded at 400°–450° F. into test specimens.

The test employed for determining flame retardant activity was ASTM D-2863, "Limiting Oxygen Index". The results are summarized in Tables I and II.

Table I

| Example | Polypropylene parts by wt | Flame Retardant[1] type | pbw | Trityl[2] compound type | pbw | LOI[3] |
|---|---|---|---|---|---|---|
| 1 | 100 | none | 0 | none | 0 | 17.5 |
| 2 | 95 | $(\phi O)_3PO$ | 5 | none | 0 | 18.9 |
| 3 | 95 | PHT-4 | 5 | none | 0 | 19.4 |
| 4 | 90 | $(\phi O)_3PO$ / PHT-4 | 5 / 5 | none | 0 | 22.7 |
| 5 | 89 | $(\phi O)_3PO$ / PHT-4 | 5 / 5 | $TrCH_2CO_2H$ | 1 | 25.7 |
| 6 | 89 | $(\phi O)_3PO$ / PHT-4 | 5 / 5 | $TrCO_2H$ | 1 | 26.0 |
| 7 | 89 | $(\phi O)_3PO$ / PHT-4 | 5 / 5 | Tr—C$_6$H$_4$—OH | 1 | 27.7 |
| 8 | 89 | $(\phi O)_3PO$ / PHT-4 | 5 / 5 | Tr—C$_6$H$_4$—NH$_2$ | 1 | 24.6 |
| 9 | 89 | $(\phi O)_3PO$ / PHT-4 | 5 / 5 | $TrCH_2CH_3$ | 1 | 28.1 |
| 10 | 94 | PHT-4 | 5 | $TrCH_2CH_3$ | 1 | 27.5 |
| 11 | 89 | $(\phi O)_3PO$ / PHT-4 | 5 / 5 | $Tr^+SbCl_6^-$ | 1 | 23.6 |
| 12 | 89 | $(\phi O)_3PO$ / PHT-4 | 5 / 5 | $Tr^+BF_4^-$ | 1 | 27.3 |
| 13 | 89 | $(\phi O)_3PO$ / PHT-4 | 5 / 5 | (9-phenylfluorene-type structure) | 1 | 24.4 |
| 14 | 95 | HB-32 | 5 | none | 0 | 25.4 |
| 15 | 94 | HB-32 | 5 | Tr—C$_6$H$_4$—OH | 1 | 27.1 |

Notes:
[1] PHT-4 = tetrabromophthalic anhydride; HB-32 tris(2,3-dibromopropyl) phosphate, $(\phi O)_3PO$ = triphenylphosphate.
[2] Tr = $(C_6H_5)_3C—$.
[3] LOI = Limiting Oxygen Index, ASTM D-2863.

The data presented in Table I clearly demonstrate the remarkable synergistic effect of compounds having a trityl group attached to an activated carbon atom. Although organic bromine compounds increase the Limiting Oxygen Index value greatly over uncompounded polypropylene the including of a minor amount of specific trityl sunergists produces a major further improvement in Limiting Oxygen Index in each instance.

Not all Trityl compounds are effective synergists for organic bromine flame retardant compounds. As shown in Table II, triphenyl methane, and tetraphenyl methane are ineffective in this regard.

Table II

| Exam. No. | Polypropylene Parts by wt. | Flame Ret'd[1] Compd | pbw | Trityl Comp[2] Type | parts | LOI[3] |
|---|---|---|---|---|---|---|
| 14 | 95 | HB-32 | 5 | None | — | 26.4 |
| 16 | 94 | HB-32 | 5 | Tr-H | 1 | 25.7 |
| 4 | 90 | PHT-4 / $(\phi O)_3PO$ | 5 / 5 | None | — | 22.7 |
| 17 | 89 | PHT-4 / $(\phi O)_3PO$ | 5 / 5 | Tr-H | 1 | 20.2 |
| 18 | 89 | PHT-4 / $(\phi O)_3PO$ | 5 / 5 | Tr-C$_6$H$_5$ | 1 | 22.3 |

Notes:
[1] HB-32 = tris(2,3-dibromopropyl) phosphate; PHT-4 = tetrabromophthalic anhydride; $(\phi O)_3PO$ = triphenylphosphate.
[2] TrH = $(C_6H_5)_3C—H$; Tr-C$_6$H$_5$ = $(C_6H_5)_3C—C_6H_5$ Synergistic activity for organic bromine flame retardant compounds clearly is not a property common to all compounds containing the triphenylmethyl or trityl group; where the trityl group is attached to an an activated carbon atom enhancement is great, yet where the trityl group is attached to hydrogen as in triphenyl-methane (Examples 16 and 17 ), or to the unactivated carbon of a phenyl group (Example 18 ), no synergistic enhancement results as seen by comparison of the LOI values for these Examples with control Examples 4 and 14.

The invention willl thus be seen to be flame retardant polypropylene compositions comprising polypropylene and organic bromine flame retardant compounds which exhibit synergistically improved flame retardance by way of the addition of minor amounts of a specific trityl compound represented by the structure $(C_6H_5)_3C-(CH_2)_n-A$ wherein A is a radical selected from the group consisting of —H, —CO$_2$H, —CHO, —CO—AR, —CO$_2$Alkyl, —CO$_2$Aryl,

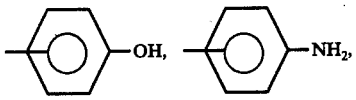

SbCl$_6$—and BF$_4$—, and $n$ is an integer from 0-4.

I claim:

1. In a flame retardant polypropylene composition comprising polypropylene and an organic bromine flame retardant compound, the improvement wherein from 0.1 to 10 parts by weight of a trityl synergist per hundred parts of final composition is included therein, said synergist being a compound of the formula $(C_6H_5)_3C-A$ wherein A is selected from the group consisting of lower alkyl, aminophenylene, hydroxyphenylene, and $(CH_2)_nCO_2H$ wherein $n$ is an integer from 0 to 4.

2. A synergistic composition adapted to render polypropylene flame retardant comprising an organic flame retardant and a trityl synergist, said synergist being a compound of the formula $(C_6H_5)_3C-A$ wherein A is selected from the group consisting of lower alkyl, aminophenylene, hydroxyphenylene and —(CH$_2$)n CO$_2$H wherein $n$ is an integer from 0 to 4.

3. The composition of claim 2 wherein the organic bromine flame retardant and the trityl synergist are present in the weight ratio of from 2:1 to about 10:1.